United States Patent [19]

Gerum et al.

[11] Patent Number: 4,677,030

[45] Date of Patent: Jun. 30, 1987

[54] MAGNETIC STORAGE MEDIUM

[75] Inventors: Johannes Gerum, Unterpfaffenhofen; Burkhard Nippe, Munich; Walter Meckel, Neuss, all of Fed. Rep. of Germany

[73] Assignee: Agfa Gevaert Aktiengesellschaft, Leverkusen, Fed. Rep. of Germany

[21] Appl. No.: 690,043

[22] Filed: Jan. 9, 1985

[30] Foreign Application Priority Data

Jan. 19, 1984 [DE] Fed. Rep. of Germany ....... 3401771

[51] Int. Cl.$^4$ ............................................. G11B 5/702
[52] U.S. Cl. ................................. 428/425.9; 427/128; 428/694; 428/900; 428/328; 428/329; 252/62.54
[58] Field of Search ..................... 428/425.9, 694, 900, 428/695, 329, 328; 427/128; 360/134–136; 252/62.54

[56] References Cited

U.S. PATENT DOCUMENTS

| | | | |
|---|---|---|---|
| 3,650,828 | 3/1972 | Higashi | 428/425.9 |
| 4,328,282 | 5/1982 | Lehner | 428/694 |
| 4,567,109 | 1/1986 | Lehner | 427/128 |
| 4,568,612 | 2/1986 | Lehner | 427/128 |
| 4,587,170 | 5/1986 | Hanai | 428/425.9 |
| 4,634,633 | 1/1987 | Ninomiya | 428/425.9 |
| 4,637,959 | 1/1987 | Ninomiya | 428/425.9 |

*Primary Examiner*—Ellis P. Robinson

*Attorney, Agent, or Firm*—Connolly & Hutz

[57] ABSTRACT

What is claimed is a magnetic storage medium in which the polyurethane binder system forms a three-dimensional network independently of reactive low molecular weight substances present on the magnetic pigment or in the dispersion and the production of such a storage medium. The binder in the colored magnetic layer consists of a reaction product of polyisocyanates having an average functionality of from 2.1 to 4 (A) with predominantly difunctional aromatic amino-terminated polyurethanes having an average molecular weight of at least 10,000 (B) and optionally one or more hydroxyl group-containing polyesters having an OH number of from 100 to 450 (C), and/or predominantly difunctional aromatic polyamines having a molecular weight of from 100 to 400 (D) the ratio of isocyanate groups present in (A) to the isocyanate reactive groups present in (B), (C) and (D) being from 0.3:1 to 20:1, preferably from 0.8:1 to 20:1. With this binder system, it has been possible to achieve direct linkage of the polymeric binder chains and to suppress side reactions. This has enabled a soft polyurethane agent to be used, with the result of smooth dispersion of the magnetic lacquer and hence increase in the signal/noise ratio of the magnetic recording medium. The subsequent cross-linking which takes place according to the present invention enables the mechanical properties of the recording medium to be adjusted to the exact result required after the magnetic lacquer has been applied to a support.

9 Claims, No Drawings

MAGNETIC STORAGE MEDIUM

This invention relates to a storage medium consisting of a non-magnetic layer support, and, situated on this support, at least one magnetizable layer containing finely divided magnetic pigments and polyurethanes as binder.

It is known that magnetic recording media having a high storage density do not have sufficient wear-resistance unless the binder system is based on a three dimensionally-linked network. Various methods have been proposed to this end. For example, a high molecular weight, abrasion-resistant melamine resin is obtained as binder matrix by the reaction of hexamethylol melamine with binders containing functional groups in the presence of acids as catalysts. Compounds mentioned as suitable binders include, inter alia, hydroxyalkyl methacrylates, alkyd resins, epoxide resins, polyvinyl alcohol derivatives and cellulose derivatives. If a sufficient reaction velocity is to be obtained, however, this cross-linking reaction must be catalysed with strong acids, but these lead to degradation of the polymer and drastic reduction in the stability of the tape, especially when copolymers based on polyesters/polyurethanes are added. Morever, the sound and video heads used especially for magnetic recording supports having a high storage density are damaged by these strong acids so that a marked loss in level occurs within a short time.

Phenoxy and epoxy resins may also be linked to form a three-dimensional network in the presence of acids or bases, but the catalyst required have the same disadvantages of causing degradation of the binder or corrosion of the pick-up and playback heads as the catalysts used for synthesis of the high molecular weight melamine resin.

By far the most commonly used method of attempting to build up a high molecular weight binder network consists of adding isocyanate group-containing compounds to the magnetic lacquer, but this is liable to be accompanied by numerous side reactions which compete with the desired formation of linkages in the binder Thus, pigments having the surface occupied by low molecular weight, reactive compounds to improve the dispersibility are used in particular for magnetic recording media having a high storage density. Amines (JP 76/153839), fatty acids (JP 77/30649) and silicones (JP 76/126713) have been described for this purpose The reaction of these compounds with the isocyanate component, however, leads to formation of low molecular weight compounds which destabilize the magnetic layer.

Substances added as lubricants to magnetic recording media also frequently give rise to undesirable side reactions with the isocyanate component. When fatty acids (JP 73/82333), mono- or di-functional glyceric esters (IBM Techn. Discl. Bull. 23, 1981), long-chain aliphatic alcohols (JP 77/99171) or long-chain alkylamines (JP 79/65799) are added to the magnetic dispersion, the isocyanate group-containing compounds are inactivated, thereby again giving rise to low molecular weight compounds which reduce the stability of the layer.

The most important side reaction with the low molecular weight isocyanate component is that which takes place with the water introduced into the magnetic dispersion by way of the magnetic pigment, the polymeric binder or the solvent. Compared with the other isocyanate-reactive compounds, water is present in molecular excess, is highly mobile on account of the small size of the molecule and has the highest reactivity. When an excess of water is present, the cross-linking component reacts to form a polyurea structure and, although this improves the modulus of elasticity of the magnetic layer, it does not reduce the tendency to abrasion, nor does it improve the resistance to solvents.

The wear-resistance of a magnetic recording medium may be controlled not only by extensive cross-linking, but also by the nature of the polymeric binder itself. This means that the mechanical properties of the magnetic layer may be adjusted in the desired direction by increasing the hardness, modulus of elongation and tear resistance of the binder. This may be achieved by two different methods. If a hard binder, e.g. a phenoxy or epoxy resin, a copolymer of vinyl chloride/vinyl acetate/vinyl alcohol or a copolymer of vinyl chloride/vinylidene chloride is mixed with a soft polyester-polyurethane component, the desired properties may to a large extent be adjusted as required, but in most cases the thermodynamic incompatibility of the components results in separation of the components of the binder system. In the long term, this manifests in a drastic deterioration in all the mechanical properties of the magnetic recording medium. Such separation of components may be avoided if the desired mechanical properties may be adjusted by a single polymer. The polyurethane system is an obvious choice for this purpose since it offers a wide range of properties in the end product by providing a variety of combinations of soft and hard segments in the polyurethane. Thus, by increasing the proportion of hard segments and lowering the proportion of soft segments, it is possible to produce a single binder system providing the desired high level of mechanical properties. One disadvantage of this procedure, however, is a reduction in the dispersibility of the finely divided magnetic pigments. The increase in storage density achieved in recent years necessarily increased the requirement for mechanical stability of the magnetic recording medium. This could hitherto not be achieved by cross-linking the binder owing to the undesirable side reactions. It was found that either the abrasion-resistance of the magnetic layer was insufficient or the cross-linking reaction had to be accelerated using a catalyst which damaged the transformer heads or caused degradation of the binder. The mechanical requirements or tapes of high storage density could not be solved satisfactorily by using hard polymer binders since separation occurred when these were mixed with an elastic binder and, moreover, the use of a single type of hard binder causes a drastic reduction in the dispersibility of the magnetic pigments.

It is therefore an object of the present invention to provide a binder system for a magnetic storage medium which will form a three-dimensional network by the linkage of a high molecular weight polyurethane with a polyfunctional, low molecular weight diisocyanate compound regardless of reactive low molecular weight substances present on the pigment or in the magnetic dispersion.

The binder system should preferably consist of a single polymer component which will not adversely affect the dispersibility of the magnetic pigment.

This problem was solved according to the present invention by a magnetic storage medium consisting of a non-magnetic layer support and, situated on this support, at least one magnetizable layer containing finely divided, magnetic pigments and binders consisting of polyurethanes, the polyurethane binders being reaction products of:

(A) polyisocyanates having an average functionality of from 2.1 to 4; and
(B) predominantly difunctional aromatic amino-terminated polyurethanes having an average molecular weight of at least 10,000; and, optionally,
(C) from 5 to 40%, by weight, based on component (B), of one or more polyesters containing hydroxyl groups and having an OH number of from 100 to 450 and/or
(D) from 2 to 10%, by weight, based on component (B), of predominantly difunctional aromatic polyamines having molecular weights of from 108 to 400;

the ratio of isocyanate groups in (A) to isocyanate-reactive groups in (B), (C) and (D) being from 0.3:1 to 20:1.

Polyurethanes (B) having an average molecular weight of at least 10,000 may be prepared by various methods. For example, predominantly difunctional aromatic amino-terminated polyesters or polyethers having a molecular weight of from 600 to 4000, as described in DE-PS Nos. 2,348,419; 3,131,253 or 3,223,395 may be reacted with predominantly difunctional polyisocyanates in such proportions that the ratio of amino groups to isocyanate groups is from 1:0.97 to 1:0.70.

According to another method, the aromatic amino-terminated polyurethanes may be prepared in solution from a reaction mixture containing a substantially difunctional mixture of isocyanate-reactive compounds selected from hydroxyl polyesters and/or polyethers in the molecular weight range of from 300 to 6000 and/or low molecular weight diols, diamines and amino alcohols in the molecular weight range of from 32 to 400 having an average OH number equivalent of from 40 to 1200 and at least one substantially difunctional polyisocyanate in which the ratio of isocyanate groups (b) to the isocyanate-reactive groups (a) is from 1.45:1 to 1.02:1. The reaction between (a) and (b) results in a prepolymer containing isocyanate groups and having an average molecular weight of at least 10,000, which is reacted with polyamines selected from araliphatic and/or aromatic, predominantly difunctional, polyamines, the two reactants being used in such proportions that the ratio of isocyanates groups in the prepolymer having a molecular weight of 10,000 to amino groups in the polyamines is from 1:5 to 1:1.5.

In a particularly preferred method, the aromatic amino-terminated polyurethanes (B) are prepared in solution by the reaction of a reaction mixture containing isocyanate groups, consisting of a substantially difunctional isocyanate-reactive mixture selected from hydroxyl polyesters and/or polyethers in the molecular weight range of from 300 to 6000 and/or low molecular weight diols, diamines or amino alcohols in the molecular weight range of from 32 to 400 having an average OH number equivalent of from 40 to 1200 and at least one substantially difunctional polyisocyanate to produce a prepolymer containing isocyanate groups and having an average molecular weight of at least 10,000, which is then reacted with araliphatic diamines in such proportions that the ratio of isocyanate groups in the prepolymer having a molecular weight of at least 10,000 to amino groups is from 1:2.5 to 1:1.8.

In another particularly preferred method for the preparation of aromatic amino-terminated polyurethanes (B), aromatic diamines are used instead of araliphatic diamines and the proportion of isocyanate groups in the prepolymer having a molecular weight of at least 10,000 to amino groups is from 1:5 to 1:2.

Another, also particularly preferred method for the preparation of amino-terminated polyurethanes (B) uses aromatic diamines the amine groups of which differ in reactivity due to either steric and/or mesomeric causes, these diamines being used in such proportions that the ratio of isocyanate groups in the prepolymer having a molecular weight of at least 10,000 to amino groups is from 1:5 to 1:2.

The conventional polyisocyanates, polyhydroxyl compounds and chain-lengthening agents are used as starting materials for the polyurethane solutions prepared by the processes described. The conventional organic solvents of polyurethane chemistry are used.

This method of preparation of polyurethanes not only has the advantage that, once the polyurethane solution has reached the desired viscosity in the course of the synthesis, rapid chain-termination occurs without significant change in the viscosity, but it has the added advantage that other types of reactive $NH_2$ groups are incorporated in the polyurethanes at the same time. By means of these aromatic amino end groups, the polyisocyanates subsequently added as cross-linking agents, usually in a quantity of from 1 to 30% by weight, based on the polyurethane, are capable of bringing about the rapid and intensive cross-linking of the binder component, which is very important for a magnetic storage medium. At the same time, the solutions employed are sufficiently stable in storage and during the time required for processing. Furthermore, the temperatures required for the polyisocyanate cross-linking reaction are considerably lower; cross-linking may occur even at room temperature if the solvent-free coatings are left to stand for some time. This intensive cross-linking does not occur at low temperatures when conventional polyurethanes with hydroxyl groups are used for the reaction with the polyisocyanates.

Although the viscosities of the solutions may also be stabilized in known manner by stopping with monofunctional compounds, such as butanol or dibutylamine, the resulting polyurethanes contain relatively unreactive end groups, e.g. urethane or urea groups. Cross-linking may then still be achieved by employing high temperatures to enable the very much less reactive urethane and/or urea groups to react by allophanate or biuret reactions, but such high temperatures are uneconomical and liable to damage the polyurethanes and the substrate to be coated.

The modified polyurethanes are so adjusted in reactivity towards the cross-linking polyisocyanates by the choice of diamines used as stopping agents that processing mixtures of polyurethanes and polyisocyanate cross-linking agents may be produced having sufficient stability in storage and sufficient stability for the processing period. If, on the other hand, chain-terminating agents of the type resulting in aliphatic amino or hydrazide end groups are used according to the known art, virtually instantaneous reaction may take place with the polyisocyanate cross-linking agents so that the solution gels. The same applies when polyurethanes having amino or hydrazide end groups are produced by reaction the isocyanate prepolymers with a slight excess of aliphatic diamines or dihydrazide compounds. Even the reaction with aliphatic diisocyanates, which sets in rapidly, has been used for synthesis of relatively high molecular weight polyurethanes in solution (DE-PS No. 1,157,386).

The reaction of relatively high molecular weight polyurethanes (molecular weight 10,000) containing isocyanate end groups with chain-terminating agents according to the present invention based on preferably araliphatic or otherwise aromatic diamines in which the amino groups differ in reactivity results in polyurethanes solutions which are stable as solutions, do not rapidly become pasty and do not precipitate from solvents. Compounds having molecular weights of up to 6000 containing amino end groups, such as may be obtained by the reaction of low molecular weight isocyanate group-containing prepolymers with excess diamines (DE-B No. 1,694,152, columns 3 and 4) are not sufficiently stable in solvents and, according to the above-mentioned document laid open to public inspection, are therefore used for other purposes.

According to the process described here, the polyaddition reactions for synthesising polyurethanes above a molecular weight of 10,000 are terminated by the addition of chain-terminating agents according to the present invention. Above this limit, however, it is possible to produce polyurethanes having the same overall composition corresponding to the starting components, but a different chain-length (different molecular weight above 10,000), so that different properties are obtained in principle, solutions having concentrations of, for example, from 10 to 70%, by weight, may be obtained with viscosities of from 500 to 80,000 mPa.s preferably from 2000 to 60,000 mPa.s, at room temperature but polyurethane solutions having concentrations of from 20 to 60%, by weight, and viscosities of from 2000 to 50,000 mPa.s are preferred.

The polyurethanes having a molecular weight of at least 10,000 still containing isocyanate end groups, corresponding to an isocyanate content of $\leq 0.84\%$ or an end group equivalent of $\leq 0.2$ equivalents of isocyanate end groups per kg of polyurethane, which are required to be reacted with the chain-terminating agents, may be prepared by basically known methods from the conventional starting materials, preferably in solution, using a single-stage or multi-stage reaction.

The organic polyisocyanates to be used are mainly difunctional diisocyanates, e.g. aliphatic, cycloaliphatic, araliphatic, aromatic or heterocyclic polyisocyanates preferably having an isocyanate functionality of 2, such as those described in W. Siefken, Liebigs Annalen 562, 75 (1948) and which are mentioned as preferred diisocyanate components in DE-OS No. 2,929,501. The following are preferred polyisocyanates: diphenyl methane-4,4'- and/or 2,2'-diisocyanate, tolylene-2,4- and/or -2,6 diisocyanate, para-phenylene diisocyanate, 3,3'-dimethyl-diphenyl-4,4'-diisocyanate, mono, bis- and tetra-$C_1$-$C_4$ alkyl-substituted diphenyl methane-4,4'-diisocyanates, naphthalene-1,5-diisocyanate and aliphatic or cycloaliphatic diisocyanates, such as hexamethylene diisocyanate, trimethyl hexamethylene diisocyanate, lysine methyl ester diisocyanate, dicylohexyl methane-4,4'-, -2,4'- and/or 2,2'-diisocyanate hexahydrotolylene diisocyanates, dicylohexyl diisocyanates and isophorone diisocyanate.

Small proportions, say 5 mol %, of higher functional isocyanates may also be used, e.g. benzene-1,3,5-triisocyanate, polyphenyl-polymethylene polyisocyanates, such as those described, for example, in British Pat. Nos. 874,430 and 848,671, polyisocyanates containing biuret groups, polyisocyanates containing isocyanurate groups, and higher functional polyisocyanates prepared by the reaction of trifunctional or higher functional low molecular weight polyols with excess quantities of diisocyanates. Various relatively high molecular weight polyhydroxyl compounds of the type conventionally used for the prepartion of polyurethanes may be used as relatively high molecular weight, substantially difunctional polyhdroxyl compounds having molecular weights of from 400 to 6000. Typical examples are given, for example, in DE-AS No. 2,920,501 and include, e.g. relatively high molecular weight polyesters, polyester amides, polyethers, polyacetals and polycarbonates, preferably having molecular weights of from 800 to 3000, and compounds having about two hydroxyl groups per polyhydroxyl compound within the above-mentioned molecular weight range. Suitable hydroxyl polyesters for the process include, for example, the reaction products of polyhydric, preferably dihydric, alcohols and polybasic preferably dibasic, carboxylic acids, carboxylic acid esters and/or carboxylic acid anhydrides. Hydroxycarboxylic acids and lactones, e.g. caprolactone, may also be used. Suitable polesters have also been described, for example, in Houben-Weyl Volume XIV/2, pages 12 to 29, Thieme Verlag, Stuttgart 1963.

The polycarboxylic acids may be aliphatic, cycloaliphatic, aromatic or heterocyclic. The following are examples of such carboxylic acids and derivatives thereof: oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, diethyl succinic acid and cyclohexane-1,4-dicarboxylic acid.

The alcohol components used may be, for example, ethylene glycol, diethylne glycol, triethylene glycol, 1,2- and 1,3-propanediol, 1,4-, 1,3-, 1,2- and 2,3-butane diol, 1,5-pentane diol, 1,6-hexane diol, 1,8-octane diol, neopentyl glycol, 1,4-bis-(hydroxymethyl)-cyclohexane, 2-methyl-1,3-propane diol or alkoxylated bisphenols or hydrogenation products thereof corresponding to the following general formula:

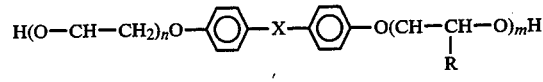

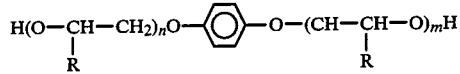

wherein
$X = R_1 - C - R_2$; $SO_2$; $N - R_3$
n and m = 2–6
R = H, $CH_3$ $R_1$ may be the same as or different from $R_2$, but may also together with X represent a cycloaliphatic hydrocarbon ring having 5 or 6 carbon atoms, hydrogen or alkyl groups having from 1 to 6 carbon atoms.

Minor quantities (about 5 mol %) of higher functional polyols, such as glycerol, trimethylolpropane, 1,2,6-hexane triol, 1,2,4-butane triol, pentaerythritol or sorbitol, may also be used. Polesters of unsaturated fatty acids containing a proportion of double or triple bonds, polyesters or copolyesters of lactones, such as $\epsilon$-caprolactone, and hydroxycarboxylic acids, such as $\omega$-hydroxycaproic acid, may also be used.

The polyester amides which may be used for the polyurethanes described are obtained when a proportion of the dihydric alcohol of the polesters is replaced by aminoalcohols, diamines or polyamines. Ethanolamine or ethylene diamine is preferably used for this purpose.

The relatively high molecular weight polyhydroxyl compounds may also contain linear or slightly branched polyethers preferably containing two hydroxyl groups, e.g. tetrahydrofuran polymers or addition products of alkylene oxides with starting compounds. Ethylene oxide, propylene oxide, butylene oxide, styrene oxide and epihalogenhydrins are examples of suitable alkylene oxides. The starting components used may be compounds with labile hydrogen atoms, such as water, alcohols or amines, e.g. ethylene glycol, 1,2- and 1,4-propylene glycol, 2,2-bis(4-hydroxyphenyl)-propane and aniline.

Polyacetals may also be used as polyhydroxyl compounds. These may be obtained, for example, by the condensation of formaldehyde or some other aldehyde with polyhydric alcohols of the type described.

Known types of polycarbonates are particularly preferred, for example those which may be prepared from the diol components mentioned above, in particular those based on 1,6-hexane diol, e.g. by a reaction with diphenyl carbonate or phosgene.

The low molecular weight chain-lengthening agents with labile hydrogen atoms used (Zerewitinoff-active hydrogen atoms) are compounds which react substantiallly as difunctional compounds with isocyanates and have molecular weights of 18 or 32 to 399, preferably from 62 to 254.

Low molecular weight diols are particularly suitable for this purpose, but amino alcohols or diamines or mixtures or the chain-lengthening agents may be used, or a stepwise reaction with different chain-lengthening agents may be carried out.

Suitable chain-lengthening agents include diols and mixtures thereof, e.g. ethylene glycol, 1,2- and 1,3-propane diol, 1,4-, 1,3-, 1,2-, and 2,3-butane diol, 1,5-pentane diol, 1,6-hexane diol, neopentyl glycol, 1,4-bis(hydroxymethyl)-cyclohexane, 2-methyl-1,3-propane diol di-, tri-, and tetra ethylene glycol, alkoxylated bisphenols and hydrogenation products thereof which have been described above as the diol components for the preparation of polyesters; or ester diols, e.g. hydroxypivalic acid/neopentyl glycol ester.

A certain proportionn preferably 5 mol %, of higher functional polyols, such as trimethylolpropane, may also be used.

Amino alcohols, such as ethanolamine, N-methyldiethanolamine or 3-aminopropanol, may be used.

Aliphatic and cycloaliphatic diamines are also suitable, e.g. ethylene diamine, tetramethylene diamine, 1,6-hexamethylene diamine, 1,12-dodecamethylene diamine, 1-amino-3-aminomethyl-3,5,5-trimethylcyclohexane, 2,4- and 2,6-hexahydrotolylene diamine, 2,4'- and 4,4'-diaminodicyclohexyl methane, 1-amino-2-aminomethyl-3,3,5(3,5,5)trimethyl cyclopentane, tolylene diamine, p-xylylene diamine, 4,4'-diaminodiphenyl methane, hydrazine, methylhydrazine, N,N'-dimethyl hydrazine and homologues thereof.

Extensive examples of starting materials (polyisocyanates, relatively high molecular weight polyhydroxyl compounds and low molecular weight chain-lengthening agents, as well as catalysts and auxiliary agents and additives optionally used) are given in DE-A No. 2,854,384.

The solutions of polyurethanes (B) are preferably prepared by adding the polyisocyanates to a solution of the relatively high molecular weight polyols and/or low molecular weight chain-lengthening agents in a portion of the solvent. As the reaction progresses and the viscosity increases, further solvent may be added portionwise until the required final concentration is obtained. The reaction is continued until the polyurethane is formed, but still contains at least 0.2 equivalents of NCO per 1000 g. The reaction is then stopped according to the present invention and the product converted into polyurethanes containing aromatic amino end groups.

The reaction temperatures used are in the region of from about 30° to 130° C., preferably from 50° to 100° C.

Alternatively, a two-stage reaction may be employed, in which the relatively high molecular weight polyols and optionally low molecular weight diols are first reacted with the diioscyanates either solvent-free or in (a proportion of) the solvent(s). The polymer chain is then lengthened using the above-mentioned low molecular weight chain-lengthening agents and the viscosity increased. If necessary, the reaction mixture may be diluted to the required final concentration as described.

In a preferred method, the relatively high molecular weight polyols are first reacted with an excess of the polyisocyanate to form an isocyanate prepolymer which is then chain-lengthened using glycols, e.g. butane-1,4-diol, and/or by a (stepwise) reaction with diamines, e.g. isophorone diamine or N-(β-hydroxyethyl)-ethylene diamine, until the desired poluretnane, still containing isocyanate groups is obtained, and this polyurethane is then subjected to a chain-terminating reaction.

According to a particularly preferred method, a relatively high molecular weight polyhydroxyl compound, polyisocyanate and diol chain-lengthening agent and optionally solvent are reacted together in one or more stages, i.e. directly or by way of an isocyanate prepolymer, to form a relatively high molcular weight polyurethane containing isocyanate end groups, that is to say, the reaction is continued until a relatively highly viscous PU-solution is obtained (the portion of diol chain-lengthening agents in this case amounts to 80% of the total quantity of chain-lengthening agents.). The viscosity of the solution may be rapidly increased to the desired level by the addition of small quantities of (cyclo)aliphatic diamines so that a polyurethane having a molecular weight $\geq 10,000$, but still containing isocyanate groups is obtained. This polyurethane is then subjected to a stopping reaction.

The polyurethanes or polureas prepared as described above, which still contain isocyanate groups, should have a molecular weight above 10,000 when they are subjected to the stopping reaction. The average molecular weight is calculated from the formula:

$$\text{average molecular weight} = \frac{f \cdot 42 \cdot \% \text{ solids}}{\% \text{ NCO of solution}}$$

wherein f represents the functionality of the polyurethane, which is preferably about 2, but may be slightly greater or less than 2, depending upon the starting materials used, some of which may have a functionality greater than or less than 2.

The overall functionality of the polyurethane may be in the region of from about 2.2 to 1.95, but is preferably within narrower limits, i.e. from 2.05 to 1.98, and is most preferably 2. The functionality of the polyurethane solution is calculated from the components, using the formula given in the preliminary note to the Examples in DE-A No. 3,227,679. The functionality of the polyurethane is limited by the fact that the isocyanate group-containing polyurethane intermediate stage should always remain soluble in the polyurethane solvents in the desired range of concentrations. The functionality may be varied within the range indicated, depending upon the concentration and the viscosity to which the solution is adjusted. When preparing polyurethane intermediate stages containing isocyanate end groups, the concentration and viscosity are preferably adjusted to the values desired for subsequent use, or more highly concentrated solutions may be prepared, which may then be diluted to a suitable working viscosity.

The isocyanate content in the isocyanate group-containing polyurethane intermediate stages prior to the chain-terminating reaction according to the present invention should be $\leq 0.84\%$ NCO, based on the polyurethane solids content, which corresponds to $\leq 0.2$ equivalent of NCO per 1000 g of polyurethane solids content (calculated for the functionality=2.0) and is preferably $\leq 0.42\%$ NCO, corresponding to $\leq 0.1$ equivalent of NCO per 1000 g of PU, and most preferably $\leq 0.14\%$ NCO, corresponding to $\leq 0.033$ equivalent of NCO per 1000 g of polyurethane. The lower limit of the isocyanate content of the polyurethane intermediate stage is about 0.0466% NCO, corresponding to 0.001 equivalent of NCO per kg of polyurethane, but the NCO content is preferably higher, amounting to $\geq 0.014\%$ NCO, corresponding to 0.033 equivalent per 1000 g of polyurethane, and particularly $\geq 0.028\%$ NCO corresponding to 0.066 equivalent per 1000 g of polyurethane.

The solvents used for the polyurethanes may be the conventional inert solvents used for polyurethane reactions, e.g. tetrahydrofuran dioxane, ethyl acetate, methyl ethyl ketone, butyl acetate or toluene or polar solvents, such as dimethylformamide or dimethylacetamide, but the readily volatile ethers, esters and hydrocarbons of the type mentioned above are preferred.

The chain terminating agents used for the reaction with the above-mentioned relatively high molecular weight polyurethanes still containing small quantities of isocyanate groups are preferably polyamines in which one $NH_2$ group is distinctly more reactive than the other amino groups. Diamines selected from araliphatic diamines and/or aromatic diamines or aromatic diamines having $NH_2$ groups of differing reactivities are particularly preferred. The difference in reactivity within the aromatic diamines is due to steric shielding of one amino group or its inactivation by electron withdrawing substituents.

Examples of suitable chain terminating agents include araliphatic polyamines, particularly diamines of the type corresponding to general formula (I) and/or (II):

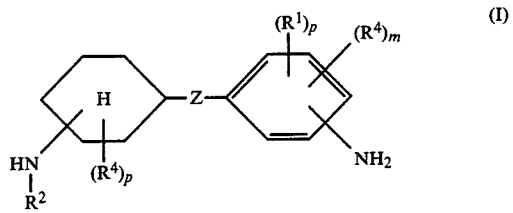

wherein
Z represents

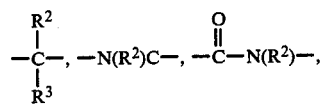

$(-S)_m-SO_2-$, $-O-$, preferably $CH_2$ or $-C(CH_3)_2$;
$R^1$ represents straight or branched-chain $C_1-C_{13}$ alkyl,

or halogen;
$R^2$ represents H or straight or branched chain $C_1-C_6$ alkyl;
$R^3$ represents H, aryl or straight or branched-chain $C_1-C_6$ alkyl;
$R^4$ represents straight or branched-chain $C_1-C_6$ alkyl;
m represents 0, 1, 2 or 3; and
p represents 0 or 1;
in general formula (I), (m+p)=0, 1, 2, 3 or 4;

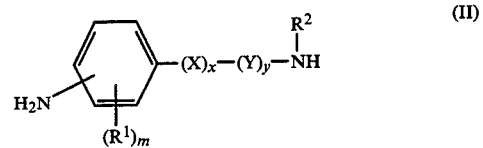

wherein
X represents $-CH_2-CH_2-CH_2$, $-NH-$ (in which case y≠zero), $-NR^4-$ (in which case y≠zero) $-O-$ (in which case y≠zero) or $-S-$ (in which case y≠zero);
x represents 0 or 1,
y represents $-(CH_2)_o$ or

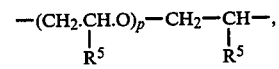

wherein
o=zero or on integer of from 1 to 6 and
p=zero or on integers of from 1 to 6,
y represents 0 or 1; and
$R^5$ represents H or methyl.

Aromatic polyamines corresponding to general formula (III) or (IV) are also suitable, particularly aromatic diamines wherein the amino groups differ in reactivity (for steric reasons or the effect of substituents):

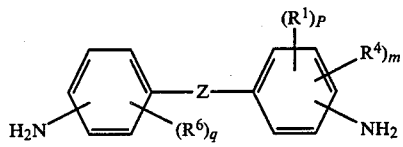
(III)

wherein
wherein
- $R^6$ represents $C_1$-$C_3$ alkyl, but not in a position adjacent to the $NH_2$-group;
- m=0, 1, 2 or 3;
- p=0 or 1 such that (m+p)=1, 2, 3 or 4; and
- q=0 or 1 such that m+p)−q≧1;

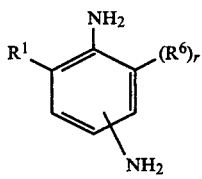
(IV)

- $R^6$ represents optionally branched $C_2$-$C_4$ alkyl;
- r=0 or 1, r may be 0 when $R^1$=COOR$^4$.

The activity of the less reactive aromatic (primary) amino group may be varied within wide limits by choice of the substituents $R^1$ and $R^4$ and/or by the sum of p and m.

Preferred araliphatic diamines are those corresponding to general formula V:

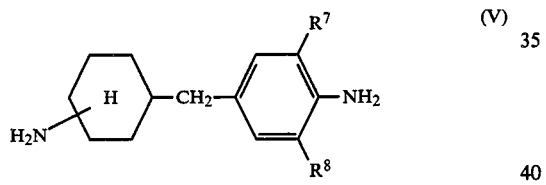
(V)

wherein
- $R^7$ and $R^8$ which may be the same or different and represent straight- or (branched-chain) alkyl groups having from 1 to 4 carbon atoms.

Preferred aromatic diamines having amino groups with differing reactivities are those corresponding to general formula (VI):

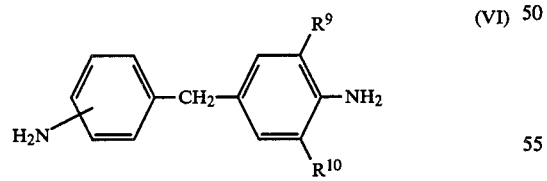
(VI)

wherein
- $R^9$ represents straight or branched-chain alkyl groups having from 1 to 4 carbon atoms, —CO$_2$R$^4$ or halogen (F, Cl, Br or I); and
- $R^{10}$ represents straight or branched chain alkyl groups having from 1 to 4 carbon atoms or halogen.

In general formulae (II) to (VI), the substituents which have not been mentioned have the same definition as in general formula (I). Where the substituents are omitted from the aromatic nucleus, the place thereof is taken by hydrogen, which has not been specifically marked.

Apart from the compounds corresponding to general formulae (I) to (VI), other selected compounds illustrated in the following list are also suitable:

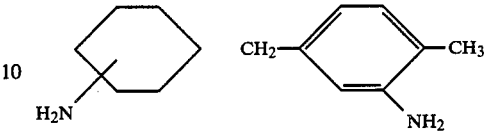

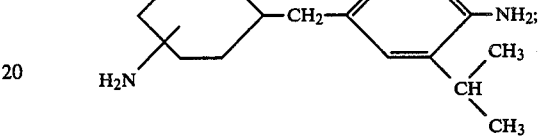

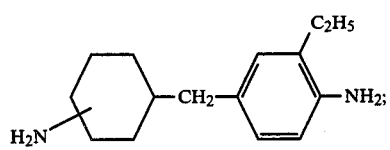

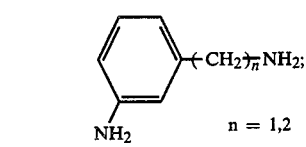

n = 1,2

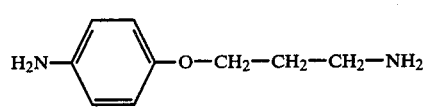

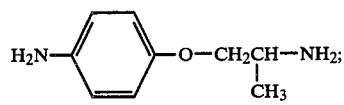

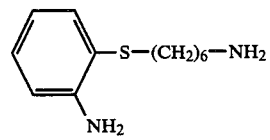

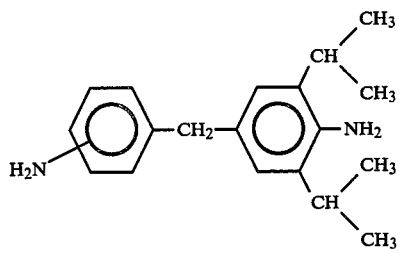

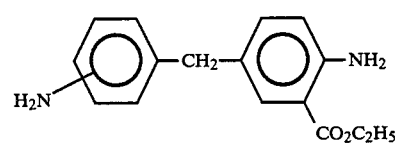

-continued

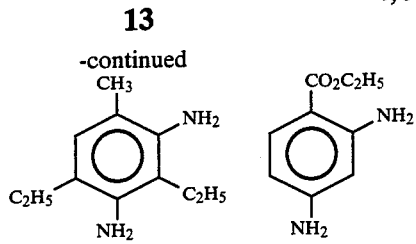

The relatively high molecular weight polyurethane still containing the given quantities of isocyanate groups is reacted in the form of a solution with the chain-terminating agent in proportions of from 1:5 to 1:1.66, preferably from 1:2.5 to 1:1.95, most preferably in the proportions of the calculated equivalent quantities of 1:2. The polyurethanes resulting from this reaction have aromatic amino end groups approximately equal in quantity to the isocyanate end groups present in the relatively high molecular weight polyurethane which has the minimum molecular weight of 10,000.

When reactions are carried out in a molar ratio within the range of from 1:1.66 to 1:2, the chain-terminating agent may to some extent continue to react in a difunctional form. This is sometimes desirable if the viscosity is required to be slightly increased. When the reactions are carried out in proportions of 1:2 to 1:5, free diamines are invariably left in the solution, but since the total quantity of diamines acting as chain-terminating agents is extremely small, these residues of free aromatic diamines are of no significance in the solution. When the polyurethanes are subsequently mixed with polyfunctional polyisocyanates for practical application, these diamines react with the polyisocyanates without giving rise to problem and are built into the cross-linked polymer. If araliphatic diamines are used as chain-terminating agents, they are preferably added in approximately equivalent proportions (1:2). If the diamines used as chain terminating agents have amino groups which differ less strongly in reactivity, they are advantageously used in quantities greater than 1:2 (and up to 1:5) in order to counteract on undesirably chain-lengthening reaction which may take place with the less reactive amino group.

For the production of this magnetic storage medium, it is important, in view of the high reactivity of the terminal amino groups of polyurethane (B) that the linkage should take place preferentially with the isocyanate component. The polyisocyanate is added to the dispersion only shortly before application of the dispersion to the layer support. Depending upon the reactivity of the stopping agent with the isocyanate compound, the progress of the reaction may be controlled in the desired direction without impairing the desired three-dimensional linkage of polyurethane component (B) by adverse side reactions. It has thus for the first time become possible to produce a magnetic dispersion of consistent quality by using a soft polyurethane and at the same time to develop outstanding mechanical properties by means of the subsequent controlled cross-linking reaction.

The following advantages are thereby achieved.
reduction in tape abrasion
improvement in solvent-resistance
increase in maximum pigment volume concentration and hence increase in magnetic sensitivity
reduction of noise and hence increase in signal/noise interval
no molecular by-products of lubricant or pigment surface coating resulting in plasticizing properties
control of velocity of cross-linking by the reactivity of the terminal amino groups used.

The following are mentioned as examples of polyurethane (B) component according to the present invention dissolved in an organic solvent for use in the magnetic layer:

1. Reaction product of a polyester of adipic acid and 1,4-butane diol, 1,4-butane diol and ethylene glycol, 4,4'diisocyanatodiphenyl methane, 1-amino-3,3,5-trimethyl-5-aminoethyl cyclohexane stopped with (3-amino-4-methylbenzyl)-cyclohexylamine.
2. Similar reaction product stopped with 4,4'-diaminodiphenyl methane.
3. Similar reaction product stopped with 4,4'-diamino-3-carbethoxy-diphenyl methane.
4. Reaction product of hexane diol carbonate, diisocyanatodiphenyl methane, 1,6-hexane diol, ethyl glycol and isophorone diamine, stopped with (3-amino-4-methylbenzyl)-cyclohexylamine.
5. Reaction product of hexane diol polycarbonate and a mixture of 2,4- and 2,6-7 tolylene diisocyanate, 1,4-butane diol, ethylene glycol and isophorone diamine, stopped with (3-amino-4-methylbenzyl)-cyclohexylamine.

The polyisocyanates (A) having an average functionality of from 2.1 to 4 are aliphatic or cycloaliphatic or, preferably, aromatic polyisocyanates, having a functionality above 2.5, preferably 3 e.g. biuret triisocyanates or trimers of hexamethylene diiosocyanate or isophorone diisocyanate, trimeric tolylene-2,4-diisocyanate, mixed trimers of hexane diisocyanate and tolylene diisocyanate, products obtained by the reaction of tolylene-2,4-diisocyanate with triols or polyols, e.g. with trimethylolpropane, or polyfunctional polynuclear polyisocyanates based on polyamines obtained from the aniline formaldehyde condensation reaction. These polyisocyanates are used in quantities of from 1 to 30%, by weight, based on the polyurethanes (B), (C), (D).

It has been found in particular that cross-linking could be further improved by the addition of a polyester (C) of OH number from 100 to 450 containing one or more hydroxyl groups in a quantity of from 5 to 40%, by weight based on component (B), and/or the addition of one or more aromatic polyamines (D) having a molecular weight of from 180 to 400 in a quantity of from 2 to 10%, by weight, based on component (B).

The hydroxyl-containing polyesters (C) are preferably those well known in lacquers technology.

Aromatic polyamines (D) include inter alia, diamines containing ester groups, such as those described in DE-PS Nos. 1,803,635; 2,040,644; 2,040,650; 2,025,900; 2,160,589 and 2,160,590, aromatic diamines subsituted with alkylthio groups according to DE-PS No.2,838,760 and halogenated diamines, such as 3,3'-dichloro-4,4'-diaminodiphenyl methane.

When more than 40%, by weight, of polyesters and more than 10%, by weight, of polyamines are added, the magnetic layer becomes brittle and no longer adheres sufficiently firmly to the layer support.

The magnetic layers are produced in known manner by dispersing the magnetic material in solutions of the polyurethane binders obtained according to the present invention, optionally with additives and applying a layer of this dispersion on a non-magnetic layer support.

The solvents used may be the same as those used for dissolving the polyurethanes, provided they have sufficient solvent power. Inter alia, dimethylformamide, dioxane, tetrahydrofuran, cyclohexane may be used, optionally also in combination with each other or with other solvents, e.g. methyl ethyl ketone, toluene or methyl isobutyl ketone.

The magnetizable material used for storage purposes may consist of γ-iron oxides, magnetites, mixed phases of magnetite and γ-iron oxides, co-doped iron oxides, ferrites, $CrO_2$, metallic pigments, such as pure iron or ferromagnetic metal alloys.

The magnetic dispersion would usually be prepared with the aid of dispersing agents, which would have to be compatible with the pigment, the solvent and the other components of the formulation, as well as the properties of the finished layer. A choice may be made from numerous known surface-active compounds, such as lecithin, cephalin, fatty acid amines and diamines and ammonium salts, thereof ethoxylated fatty acid derivatives, aliphatic and aromatic. optionally ethoxylated phosphoric acid esters, sulphosuccinic acid esters esters, sorbitan esters, aliphatic and aromatic sulphonic acids and sulphonates, fatty alcohol sulphates and numerous others.

Other components may be used in the formulation according to the desired properties of the dispersion or of the finished layer. These include in particular lubricants, such as fatty acids or fatty acid derivatives silicone oils, paraffins, waxes, fluorinated oils and dispersions of polytetrafluoroethylene. Other possible additives are, for example, plasticizers, abrasives, viscosity regulators, etc.

The coating dispersion is prepared in known manner by mixing the magnetic material with a suitable solvent by means of kneaders, stirrers, dissolvers or other mixing apparatus. The solvent may contain all or only part of the binder, as well as dispersing agents and other additives. The premixed dispersion is normally milled until the magnetic pigment has been sufficiently evenly distributed. Milling may be carried out, for example, in ball mills, bead mills, sand mills or the like, and remaining quantities of binder or additives may be added after the milling process. Subsequent coating of the non-magnetic support with the magnetic dispersion is carried out by known methods, e.g. using reverse roll coaters, screen printing devices or extruder casters. The layer supports may consist of foils of polyesters, such as polyethylene terephthalate, polyolefins, such as polypropylene, cellulose derivatives, such as cellulose triacetate, or polycarbonates or they may be rigid layer supports made of non-magnetic metals, such as Al or ceramic materials. Subsequent treatment of the coated materials, such as calendering to smooth the surface, cutting or making up the finished product is carried out in known manner.

The following properties of a magnetic tape cut to a half inch width are described to substantiate the advantages of the binders according to the present invention.
1. Swelling temperature (described in Farbe und Lack, Year 84, 1978, No. 1, page 13 et seq.)

The sample is dipped in cyclohexanone at various temperatures. Unfolding of the magnetic layer in relation to the temperature is a measure of the degree of cross-linking.
2. Reduction in weight:

The sample is extracted in THF in a Soxhlett extractor for 24 hours. The greater the weight reduction, the weaker is the cross-linkage.
3. Abrasion resistance:

A 2-hour cassette is reversed 50 times at room temperature on a VHS recorder (JVC 7200). The abrasion at the head of the drum the erasing and synchro head and the drive shaft are assessed (Grade 1: no abrasion; Grade 6: very severe abrasion).
4. Still image time:

The duration of trouble-free reproduction of a video signal is determined.
5. Dispersibility:

The magnetic orientation $M_R M_S$ is used as a measure of the dispersibility. The measurement was carried out at a saturation magnetization of 12 KOe.

The present invention will now be described in more detail with reference to Examples.

Example of preparation of polyurethane (B) for Products 1, 2 and 3

1000 g of a polyester of adipic acid and butane-1,4-diol (OH number 50.0, acid number 0.8) are dehydrated in a water jet vacuum at 100° C. for 1 hour. After the addition of 96 g of butane-1,4-diol. 66.1 g of ethylene glycol and 4260 g of tetrahydrofuran, 670 g of 4,4'-diisocyanatodiphenyl methane are added at from 40° to 45° C. The reaction causes the temperature to rise to 55° C.

The residual NCO value is determined after a viscosity of about 30,000 mPa.s at 25° C. has been reached.

For product 1, the solutions are stopped with 34.8 g of (3-amino-4-methylbenzyl)-cyclohexylamine, for product 2, they are stopped with 28.4 g of 4,4'-diaminodiphenyl methane, and for product 3, they are stopped with 53.0 g of 4,4'-diamino-3-carbethoxy-diphenyl methane.

The solutions are then diluted to a solids content of 20% with tetrahydrofuran.

Example of preparation of polyurethane(B). Product 4 292 g of ahexane diol polycarbonate, OH number 105.8, in 980 g of tetrahydrofuran are mixed with 115.7 g of 4,4'-diisocyanatodiphenyl methane at 50° C. After 30 minutes, a mixture of 8.12 g of hexane-1,6-diol and 4.27 g of ethylene glycol is introduced dropwise.

A constant isocyanate value of 0.17% is obtained after 6 hours at from 50° to 55° C.

1100 g of the prepolymer are pre-lengthened by 10% of the theoretical amount with isophorone diamine. The viscosity rises from 6800 mPa.s at 24° C. to 16,000 mPa.s at 44° C. The reaction is stopped by the addition of 8.75 g of 4-(3-amino-4-methylbenzyl)-cyclohexylamine. After dilution to a solids content of 20% with THF, the solution has a viscosity of 2800 mPa.s.

Example of preparation of polyurethane (B)- Product 5 116.8 g of a hexane diol polycarbonate of OH number 56 in 980 g of tetrahydrofuran are mixed with 216.7 g of a mixture of 65% of 2,4- and 35% of 2,6-tolylene diisocyanate at 50° C. After the addition of 12.5 ppm (based on the polyether) of dibutyl tin dilaurate, the reaction mixture is stirred for 30 minutes. A mixture of 51.23 g of butane-1,4 diol and 35.3 g of ethylene glycol is then introduced dropwise. A constant isocyanate value of 0.17% is obtained after 30 hours at from 55° to 60° C. 1100 g of the prepolymer are chain-lengthened by 75% of the theoretical amount with isophorone diamine and the viscosity rises from 1000 mPa.s at 24° C. to 16000 mPa.s at 31° C. Chain-lengthening is stopped by the addition of 2.21 g of 4-(3-amino-4-methylbenzyl)-cyclohexylamine. After dilution with THF, the solution has a viscosity of 2760 mPa.s.

One particular embodiment of the magnetic recording material according to the present invention is based on the following formulation:

| | |
|---|---|
| Magnetic pigment (Fe/Ni alloy having a coercivity of 1350 Oe) | 100 parts, by wt. |
| Lecithin | 4 parts, by wt. |
| Polyurethane according to the present invention | 20 parts, by wt. |
| Reaction product of 1 mol of 1,1,1-trimethyl propane and 3 mols of tolylene diisocyanate (2,4) (Desmodur L) 75% | 5 parts, by wt. |
| Lubricant | 2 parts, by wt. |
| Tetrahydrofuran | 150 parts, by wt. |
| Cyclohexanone | 100 parts, by wt. |

The metal pigment is intimately mixed with cyclohexanone, the solvent, the lubricant and the reactive polyurethane according to the present invention and milled in a sand mill. The dispersion obtained is mixed with Desmodur L and applied to a polyester foil in known manner, orientated magnetically, dried, calendered and then separated to a ½" width.

Examples of practical application 1-5

Polyurethanes (B) were used for each of the individual magnetic dispersions, in particular products 1-5.

Example of practical application 6

2 parts, by weight, of 20 parts, by weight, of the reactive polyurethane (1) according to the present invention are replaced by a polyester polyol (Desmophen 650, Bayer AG)

Example of practical application 7

7 of the 20 parts, by weight, of reactive polyurethane 1 according to the present invention are replaced by a polyester polyol (Desmophen 650, Bayer AG).

Example of practical application 8

6 of the 20 parts, by weight, of reactive polyurethane 1 according to the present invention are replaced by an aromatic diamine (4,4'-diamino-3,5-diisopropyl-diphenyl methane). Comparison Example The 20 parts, by weight, of reactive polyurethane according to the present invention are replaced by 10 parts, by weight, of an aromatic polyester polyurethane (Estane 5701, B. F. Goodrich Company) and 10 parts, by weight, of a partially hydrolysed polyvinyl chloride/polyvinyl acetate copolymer (Vinylite VAGH, Union Carbide).

The results are shown in Table 1.

TABLE 1

| Example No. | Swelling Temperature °C. | Reduction in weight based on pigment % | Abrasion resistance Grade | Still image time min | $M_R M_S$ |
|---|---|---|---|---|---|
| 1 | 140 | 2.7 | 1 | 60 | 0.85 |
| 2 | 140 | 3.5 | 2 | 60 | 0.85 |
| 3 | 140 | 2.5 | 1 | 60 | 0.85 |
| 4 | 140 | (3.0) | 2 | 60 | 0.90 |
| 5 | 140 | (2.0) | 2 | 60 | 0.90 |
| 6 | 70 | 4.0 | 2 | 50 | 0.86 |
| 7 | 100 | 5.3 | 2 | 55 | 0.86 |
| 8 | 120 | 4.2 | 2 | 60 | 0.86 |
| Comparison Example | 30 | 22 | 4 | 30 | 0.85 |

Similar results are obtained when iron oxides are used as magnetic pigment instead of a metal powder.

We claim:

1. Magnetic storage medium consisting of a non-magnetic layer support and, situated on this support, at least one magnetizable layer containing finely divided magnetic pigments and as a binder a polyurea-urethane composition being the reaction products of:
   (A) polyisocyanates having an average functionality of from 2.1 to 4; and
   (B) predominantly difunctional aromatic polyurethanes containing amino end groups and having an average molecular weight of at least 10,000; and,
   (C) from 5 to 40%, by weight, based on component (B), of one or more hydroxyl group-containing polyesters having an OH number of from 100 to 450; and/or
   (D) from 2 to 10%, by weight, based on component (B), of predominantly difunctional aromatic polyamines having a molecular weight of from 108 to 400;

the ratio of isocyanate groups present in (A) to isocyanate-reactive groups present in (B), (C) and (D) being from 0.3:1 to 20:1.

2. Magnetic storage medium consisting of a non-magnetic layer support and, situated on this support, at least one magnetizable layer containing finely divided magnetic pigments and as a binder a polyurea-urethane composition being the reaction product of:
   (A) polyisocyanates having an average functionality of from 2.1 to 4; and
   (B) predominantly difunctional aromatic amino-terminated polyurethanes prepared in solution by the reaction of a reaction mixture containing isocyanate groups, consisting of
      (a) a largely difunctional isocyanate-reactive mixture selected from hydroxyl group-containing polyesters and/or polyethers in the molecular weight range of from 300 to 6000 and/or low molecular weight diols, diamines and amino alcohols in the molecular weight range of from 32 to 400 having an average OH number equivalent of from 40 to 1200;
      (b) at least one substantially difunctional polyisocyanate, the ratio of isocyanate groups in (b) to the isocyanate-reactive groups in (a) being from 1.45:1 to 1.02:1, and the reaction of (a) and (b) resulting in a prepolymer containing isocyanate groups and having an average molecular weight of at least 10,000, which is reacted with polyamines selected from an aliphatic and/or aromatic, predominantly difunctional polyamines, the ratio of isocyanate groups in the prepolymer having a molecular weight of 10,000 to amino groups in the polyamines being from 1:5 to 1:1.5
   (C) from 5 to 40%, by weight, based on component (B) of one or more hydroxyl group-containing polyesters having an OH number of from 100 to 450; and/or
   (D) from 2 to 10%, by weight, based on component (B), of predominantly difunctional aromatic polyamines having a molecular weight of from 108 to 400; the ratio of isocyanate groups present in (A) to isocyanate-reactive groups present in (B), (C) and (D) being from 0.3:1 to 20:1.

3. Magnetic storage medium according to claim 2, characterised in that araliphatic diamines are used, the ratio of isocyanate groups in the prepolymer having a molecular weight of at least 10,000 to the amino groups being from 1:2.5 to 1:1.8.

4. Magnetic storage medium according to claim 2, characterised in that aromatic diamine are used, the ratio of isocyanate groups in the prepolymer having a molecular weight of at least 10,000 to amino groups being from 1:5 to 1:2.

5. Magnetic storage medium according to claims 2, 3 or 4, characterised in that aromatic diamines having amino groups differing in reactivity towards isocyanate groups due to steric and/or mesomeric factors are used, the ratio of isocyanate-reactive groups in the prepolymer having a molecular weight of at least 10,000 to amino groups being from 1:5 to 1:2.

6. Magnetic storage medium according to claims 1, 2, 3, 4 or 5 characterised in that the binder in the dispersion consists of polyisocyanate having an average functionality of from 2.1 to 4 and a predominantly difunctional, aromatic polyurethane containing amino end groups and having an average molecular weight of at least 10,000, the ratio of isocyanate groups to isocyanate-reactive groups preferably being from 0.8:1 to 20:1.

7. Magnetic storage medium according to claims 1, 2, 3, 4, or 6 characterised in that hydroxyl group-containing polyesters having an OH number of from 100 to 400 are contained therein as additional binder in a quantity of from 5 to 40%, by weight, based on binder component (B).

8. Magnetic storage medium according to claims 1, 2, 3, 4, or 6 characterised in that aromatic polyamines are contained therein as additional binder in a quantity of from 2 to 10%, by weight, based on binder component (B).

9. In a magnetic storage medium, the combination comprising a non-magnetic layer support and, situated on this support, at least one magnetizable layer containing finely divided magnetic pigments and as a binder a polyurea urethane composition being the reaction products of:
(A) polyisocyanates having an average functionality of from 2.1 to 4; and
(B) predominantly difunctional aromatic polyurethanes containing amino end groups and having an average molecular weight of at least 10,000;
the ratio of isocyanate reactive groups present in (A) to isocyanate-reactive groups present in (B) being from 0.3:1 to 20:1.

* * * * *